Figure 1:
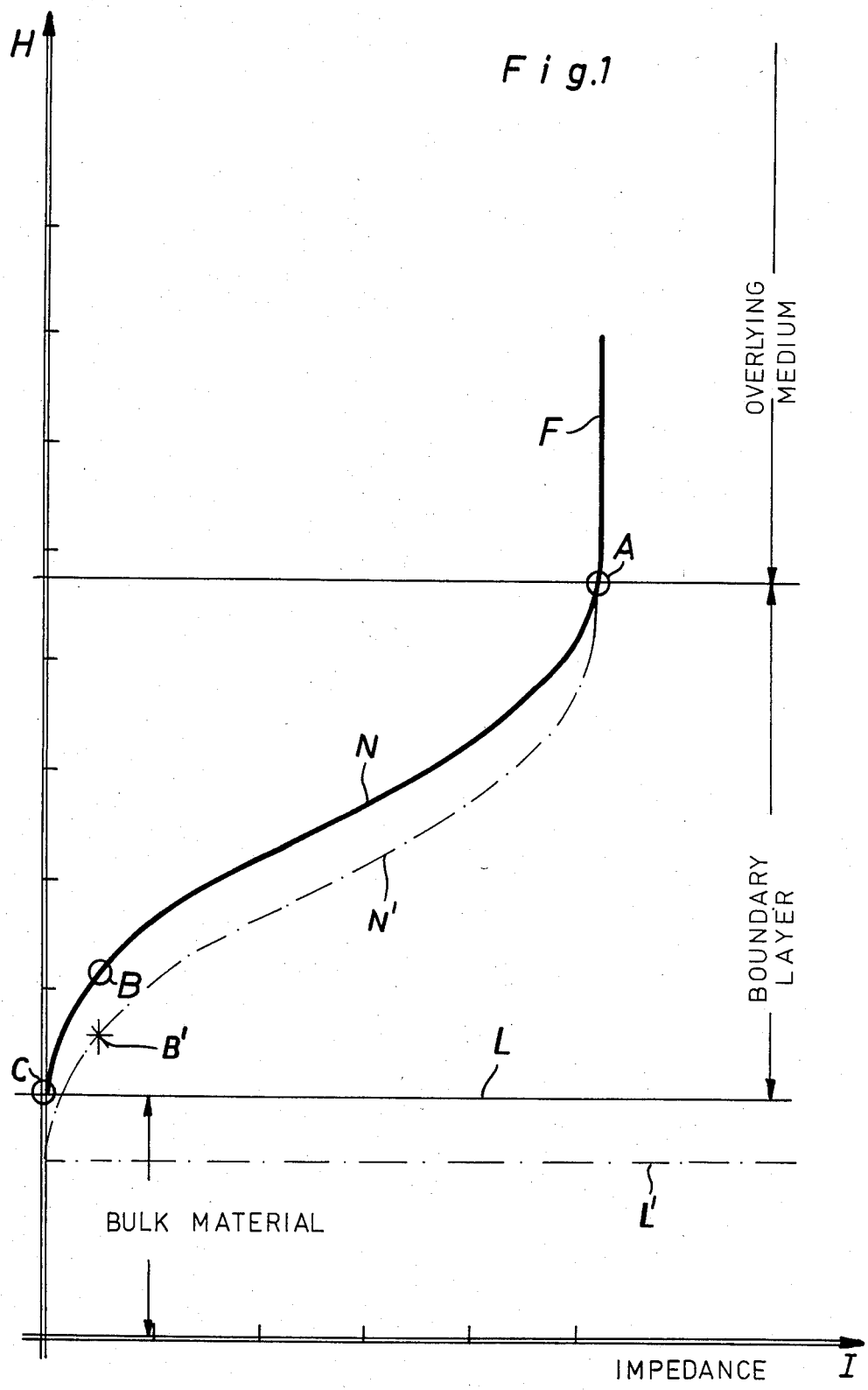

United States Patent [19]
Schliefer et al.

[11] Patent Number: 4,615,351
[45] Date of Patent: Oct. 7, 1986

[54] METHOD OF AND APPARATUS FOR MONITORING THE SURFACE LEVEL OF MATERIAL IN A VESSEL

[75] Inventors: Heinrich Schliefer, Maschen; Rüdiger Naaf, Marxen; Rolf Christ, Worpswede, all of Fed. Rep. of Germany

[73] Assignee: Norddeutsche Affinerie AG, Hamburg, Fed. Rep. of Germany

[21] Appl. No.: 626,655

[22] Filed: Jul. 2, 1984

[30] Foreign Application Priority Data

Jul. 1, 1983 [DE] Fed. Rep. of Germany ....... 3323748

[51] Int. Cl.[4] .................... F17D 3/00; B22D 11/16
[52] U.S. Cl. .................................. 137/2; 137/392;
73/304 R; 164/156; 164/450; 164/452; 222/1;
222/64; 222/56
[58] Field of Search ............... 73/304 R; 137/1, 2, 137/392; 164/48, 156, 450, 452, 453, 449; 222/56, 64, 590

[56] References Cited
U.S. PATENT DOCUMENTS

| | | | |
|---|---|---|---|
| 2,548,696 | 4/1951 | Barstow et al. | 164/453 |
| 2,698,539 | 1/1955 | Gridel et al. | 137/392 |
| 2,851,404 | 9/1958 | Jackson, Jr. et al. | 73/304 R |
| 3,486,660 | 12/1969 | Heintz | 164/453 |
| 3,511,580 | 5/1970 | Eckhardt et al. | 137/392 |
| 3,591,312 | 7/1971 | Eckhardt | 137/392 |
| 4,470,446 | 9/1984 | Kamikawa et al. | 164/452 |

FOREIGN PATENT DOCUMENTS

| | | | |
|---|---|---|---|
| 365580 | 4/1973 | U.S.S.R. | 73/304 R |
| 763690 | 9/1980 | U.S.S.R. | 73/304 R |

*Primary Examiner*—G. L. Walton
*Attorney, Agent, or Firm*—Karl F. Ross; Herbert Dubno

[57] ABSTRACT

The impedance of a zone above bulk material in a bin is measured as a probe is reciprocated toward and away from the material in this zone. The direction-change location of the probe which corresponds to the measured impedance reaching a set point value, is detected and utilized to provide the control signal for automatically replenishing the material in the bin.

7 Claims, 2 Drawing Figures

METHOD OF AND APPARATUS FOR MONITORING THE SURFACE LEVEL OF MATERIAL IN A VESSEL

Cross Reference to Related Application

This application is related to the concurrently filed copending application Ser. No. 626,653 filed, 2 July 1984 based upon German application P 33 23 749.2 filed 1 July 1983.

FIELD OF THE INVENTION

Our present invention relates to the monitoring of the level of a material in a vessel and, more particularly, to a method of and to an apparatus for measuring and automatically controlling the surface level of a bulk material in solid or liquid form in a container and especially to a system for this purpose in which the change in the surface level is detected by an electrical distance-measuring or proximity-measuring device.

BACKGROUND OF THE INVENTION

The surface level of various materials can be measured in open or closed containers by indirect distance-measuring methods utilizing, for example, radiometric, optical, acoustic and electric techniques.

Such methods have been used to indicate or detect the surface levels of the flowable contents of bins or like containers, whether of solids (sometimes referred to as bulk materials) or liquids (sometimes also included within the description of bulk materials).

For the purposes of this description, the term "flowable material" may be used to indicate solid bulk materials and liquids stored in bins or like containers.

It is also known to determine the surface level of the contents of bins or like containers by means of apparatus which indicate the degree of filling by purely mechanical means, e.g. with the aid of a diaphragm. Such indicating means is generally effective if the material in the bin consists of small particles which are uniformly shaped and are dry and freely flowable, or are liquids.

However, where the particles of the material differ substantially in size or in shape so that flow does not occur in a uniform manner and/or if the material tends to adhere to the walls of the container, difficulties are encountered in the use of conventional mechanical level detectors.

OBJECTS OF THE INVENTION

It is the principal object of the present invention to provide a method of monitoring the surface level of material in a container which overcomes the above-mentioned disadvantages.

It is another object of this invention to provide a method of measuring and automatically controlling the surface level of a material in a container which can be used in connection with a wide variety of types of bulk material or liquids and in open or closed containers or bins.

Another object of this invention is to provide an improved apparatus for the automatic control of the surface level of a body of solid or liquid bulk material in a vessel.

SUMMARY OF THE INVENTION

These objects and others which will become apparent hereinafter are attained, in accordance with the present invention, in a method of measuring and automatically controlling the surface level of a material in a container which comprises detecting a change in the distance of the free surface of this material from an electric distance-measuring device or probe by producing a distance signal which is applied to the monitoring or control means and, in response to this signal operating some means for adjusting the surface of the material in the container to the desired level.

According to the invention, the probe is movable and is used for the periodic measurement of the electrical impedance between the surface of the material and the probe in a boundary layer of a medium overlying the surface in the overlying medium.

The invention is based upon our discovery that bulk materials generally with a certain conductivity define with an overlying medium, even ambient air, a boundary layer which shows an electrical conductivity between the normal conductivity of the medium and the conductivity of the bulk material. In other words, the abrupt change in conductivity which one would expect at the interface between the overlying medium and the bulk material does not exist. Rather there is a gradient in the boundary layer of electrical impedance which changes nonlinearly but not discontinuously or abruptly, between the bulk material and the overlying medium. Utilizing an electrode or other impedance-measuring device extending into this boundary layer, therefore, we are able to respond to a change in the position of the impedance characteristic representing an ascent or descent of the bulk material and its surface and to utilize this as the signal to which the circuit responds.

Stated otherwise, when the bulk materials which are to be monitored are commercially pure, they will always have a certain electrical conductivity, even when the material is nonmetallic and is pulverulent or granular. We thus are able to measure an impedance between this material and a point spaced above its surface. When the material, as is usually the case, is contained in a metal receptacle, the metal wall of the receptacle or container can be used as a reference electrode.

We have found that there is no abrupt change in the electrical impedance at the boundary between the surface of the material and the fluid overlying this surface but that there is the aforementioned virtually continuous nonlinear change of impedance in the boundary layer.

The system of the invention can operate with solid bulky materials having a particle size ranging from small lumps to powder and including granules or pellets. The powder bulk material can be fine grain to coarse grain.

The method of the invention can be used to measure the surface level of aqueous solutions or dispersions or even of water or organic liquids such as alcohols, for example, methanol and ethanol, ketones such as acetone and ring-containing or chain compounds such as toluene and mineral oil.

The medium which overlies the surface of the material in the container and defines the boundary layer is preferably a gas atmosphere such as air or a protective gas.

According to a feature of the invention, the body of the bulk material is connected to one electrode or terminal of an impedance-measuring circuit, another terminal of which is a probe which is repeatedly lowered through at least part of the boundary layer. The output of this circuit is compared with a set point value of the impedance which represents a predetermined level of the material in the vessel and when the set point value is reached, the descent of the probe is terminated and the probe movement is reversed. A circuit can be provided for memorizing the location of the change in direction of the probe and hence the point in the descent of the probe at which the measured impedance equals the set point impedance. If the level is lower, requiring additional filling of the bulk material into the vessel, the point at which this direction change will occur will take place at a lower point and the direction-change position in each lowering and raising cycle is compared with the direction-change position originally set and any difference is converted into a control signal causing the addition of material to the bin.

Naturally, when the material has been added to the extent that the level is restored to the set point value, the direction-change position of the movable electrode will have been restored to its original location.

Means is therefore provided to change the direction of movement of the electrode when the set point impedance is reached, and means is also utilized to store the direction-change position and for comparing it with later values thereof for generating the control signal.

The probe which is used preferably has a high electrical conductivity and when it must be used in a high temperature environment, can have a refractory character, i.e. good resistance to heat.

Such probe materials can include chromium-alloy steel, chromium-nickel alloys, graphite, electrically conductive glass and high temperature electrically conductive plastics.

From a region having a very high impedance in the overlying medium, the probe is substantially vertically moved toward the surface of the material during this movement, the impedance between the surface of the bulk material or liquid (which generally can be considered ground potential) and the probe is continuously measured.

At the same time, an output signal is generated which represents the displacement of the probe. The means for this purpose can include a potentiometer of a type well-known in servomechanism systems (see pages 44 ff of *Servomechanism Practice*, McGraw Hill Book Co., New York 1960).

When the impedance assumes during the movement of the probe a very small value different from zero, this represents an indication that the probe is now only slightly spaced above the surface level of the material and the movement of the probe can be reversed under electric and/or electronic control.

As noted, the location of this reversal is indicated by means for measuring the displacement of the probe and is stored. When the probe has reached the region of high impedance above the boundary layer, the described cycle is repeated, either automatically in response to reaching this point or under the control of a timer. In both cases the measurements are taken periodically. The circuitry which is provided preferably allows the period or velocity of the movement of the probe and its travel to be varied within a wide range in adaptation of the system to any desired measuring and automatic control function.

The special advance of the method of the invention is that it can make use of a probe which can be a simple wire having a thickness or diameter of only a few millimeters to measure the surface level of a material and have control of the surface level of the material even in containers having a relatively small inside diameter, e.g. less than 50 mm. This allows the system to be used in microtechniques. Furthermore, the heights which can be measured can range from a few millimeters to several meters.

BRIEF DESCRIPTIN OF THE DRAWING

Figure 2:
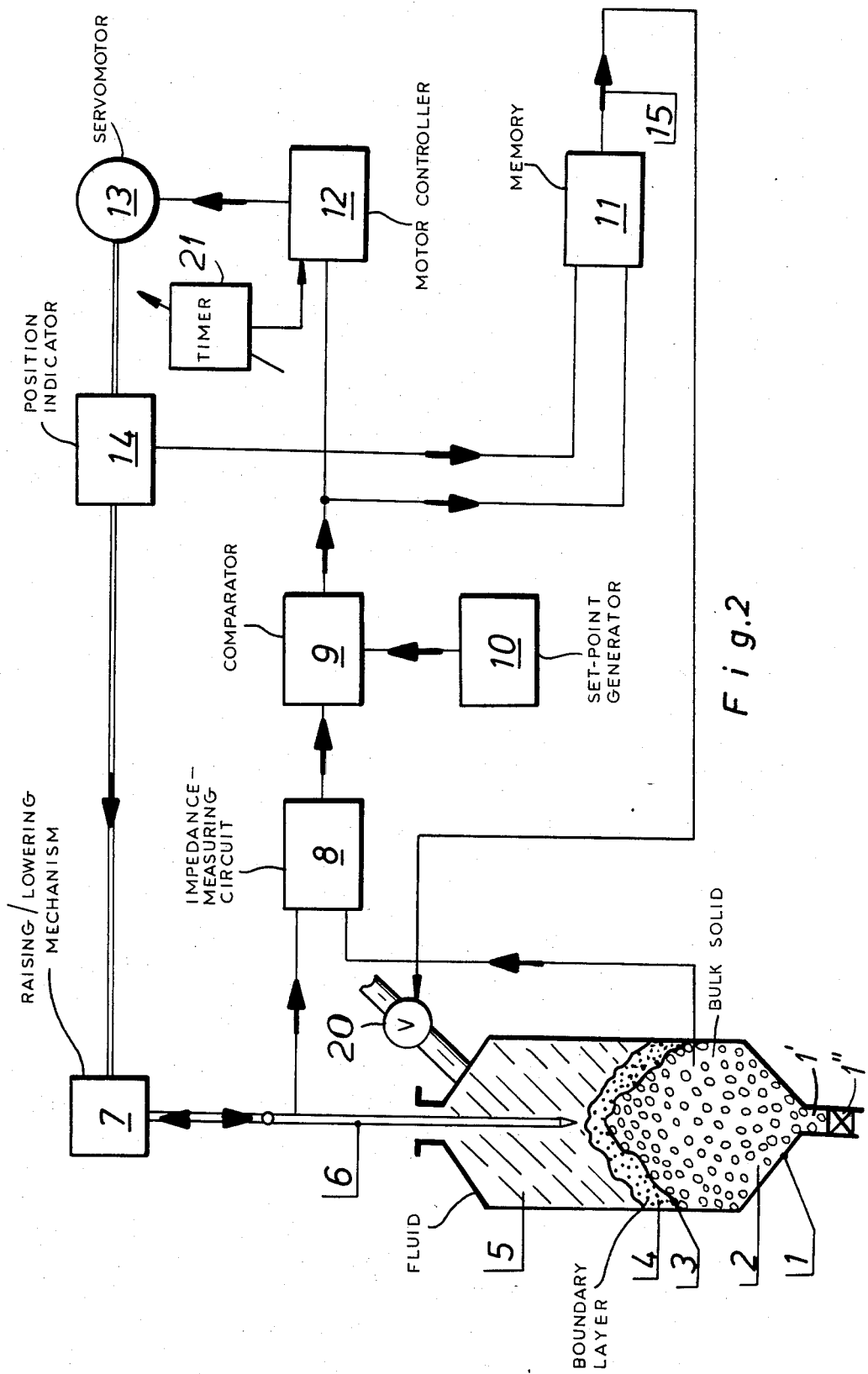

The above and other objects, features and advantages of the present invention will become more readily apparent from the following description, reference being made to the accompanying drawing in which:

FIG. 1 is a graph plotting the height H above the bulk material in a bin along the ordinate against impedance plotted along the abscissa and showing the nonlinear characteristic of the impedance measured upon displacement of a probe according to the invention; and FIG. 2 is a block diagram including a portion in highly diagrammatic form representing a vertical section through a bin, of an apparatus for carrying out this invention.

Specific Description

From FIG. 1, it will be apparent that, utilizing the actual level L of the bulk material as ground potential or zero impedance (point C), the impedance falls off over the nonlinear curve N with distance from the surface L until at point A, this impedance equals the impedance F of the fluid above the layer, i.e. the isolation resistance of the device. Consequently, to maintain the level L, a set point value B of the impedance may be selected. It is this point that is used, as will be seen below, to trigger the change in direction of the vertically reciprocating probe. (Note that resistive impedance or conductivity are the preferred measured parameters.)

Should the level fall to the level L', for example, the curve N will shift as represented by the dot-dash line N' so that the next changeover in direction will occur at the point B'.

When point B' detected by the position-measuring element or probe differs from the point B previously recorded in memory, a control signal representing the difference in these positions can be delivered to a filling means for restoring the level in the bin.

FIG. 2 represents in block diagram form the system for carrying out the method of the invention. The container 1 is here shown as a bulk material bin having an outlet 1' provided with a metering device 1" through which the bulk material 2 can be discharged. A fluid 5 overlies the bulk material 2 in the bin and has been hatched to show that it is a fluid with a different impedance, albeit one which is by an order of magnitude at the very least, preferably, different from that of the medium 2. Under these conditions, a boundary layer 4 exaggerated by the use of stipling forms above the surface 3 of the bulk material and within the medium 5.

A mechanism 7, e.g. a rack-and-pinion drive, is provided to raise and lower a probe 6 which is conductive and has its free end turned toward the bulk material.

Across the bulk material and this probe, there is connected an impedance-measuring circuit 8, the output of which is connected to a comparator 9 which also receives an input from a set point generator 10. The difference signal from the comparator is applied as one input to the memory and gating/latching circuit 11, the output 15 of which can be applied to an electrically controlled valve 20 regulating the inflow of the bulk material to the bin.

The output of comparator 9 is also applied to a motor controller 12 feeding the servomotor 13 which drives the raising and lowering mechanism 7. Connected thereto is a position indicator 14 the output of which is applied to the memory circuit 11. In the starting position shown in FIG. 2, the probe 6 has its lower end located above the boundary layer, i.e. above the point designated at A in FIG. 1. The set point adjustor has been set to feed to the comparator 9 a set point impedance value which corresponds to the impedance at point B of FIG. 1 and the latter in turn corresponds to the desired level.

When the system is set into operation, the comparator 9 detects a difference between output of the impedance-measuring circuit 8 and the predetermined or set point impedance corresponding to point B and the resulting error signal applied to the motor controller drives the probe downwardly.

The probe 6 moves downwardly until it reaches the boundary layer (point A) whereupon the impedance decreases along the curve N until point B is reached. Since we can assume that the level has not fallen, point B will correspond to the set point and the comparator 9 will reverse the motor 13 via the controller 12 to return the probe toward point A. The position of reversal as detected by the position indicator 14 is applied to the memory 11 and stored. This position represents the point C and the latter is of course proportional to the position of point B.

If point B is very close to the interface between the boundary layer and the bulk material, the output signal will closely approximate a representation of the actual surface of the material.

The motor controller 12 is so designed that the reversal is effected very quickly when the set impedance corresponding to the point B has been reached although the probe will generally by the backlash effected and inertia, continue to travel toward higher impedance values before the next measuring cycle is initiated. This has no adverse effect. When the level drops, as previously indicated, the reversal at point B', for example, does not coincide with the memorized position B and as a result the control signal is generated to operate the valve 20.

Instead of being controlled by the comparator 9 or the downfeed of the probe, a timer 21 can be provided for the motor controller. The period of measurement can thus be adjusted within wide limits.

We claim:

1. A method of monitoring changes in surface level of a nonmetallic flowable material in a container wherein a boundary layer without abrupt impedance change is provided between said material and an overlying gaseous medium, said method comprising the steps of:

periodically positively advancing a probe through said boundary layer toward said material which is selected from the group consisting of bulk solids, aqueous solutions, aqueous dispersions and organic liquids and retracting said probe away from said material so that at least during each advance and retraction cycle the probe is withdrawn from any contact with said material and out of said boundary layer and into the gaseous medium;

during the periodic advance and retraction of said probe measuring the electrical impedance between said material and said probe to provide a control signal representing the location of said boundary level; and controlling the level of said material in said container in response to a comparison of said control signal with a signal obtained from a previous advance and retractin cycle of said probe.

2. The method defined in claim 1 which comprises the step of reversing the direction of movement of said probe in a vertical sense when a selected value of said impedance has been reached.

3. The method defined in claim 2, further comprising the step of converting the displacement of said probe into an electrical signal and storing the value of said electrical signal representing the point of reversal in the direction of movement of said probe.

4. The method defined in claim 1 wherein said probe is composed of a material having high electrical conductivity.

5. The method defined in claim 4 wherein said probe is composed of a material having high heat resistance.

6. The method defined in claim 1 wherein said probe is reciprocated.

7. The method defined in claim 1 wherein said container is a bin for bulk materials, said probe is displaced vertically in said bin and said method further comprises the steps of:

establishing a set point value of said impedance representing a desired level of said material in said bin;

reversing the direction of movement of said probe from a descending direction to an ascending direction when the measured value of said impedance equals said set point value;

generating an electrical signal representing the position of said probe at each change in direction;

storing at least one electrical signal representing the position of said probe at a change in direction corresponding to the desired level; and generating said control signal upon deviation of a subsequent electrical signal representing the position of the change in direction with the stored electrical signal.

* * * * *